United States Patent [19]

Church

[11] 4,079,656

[45] Mar. 21, 1978

[54] ONE PIECE TWO PRONG FLAT HEAD NAIL TYPE FASTENER

[75] Inventor: Donald R. Church, Pilot Point, Tex.

[73] Assignee: Church & Clark, Inc., Dallas, Tex.

[21] Appl. No.: 712,501

[22] Filed: Aug. 9, 1976

[51] Int. Cl.² ........................................... F16B 15/00
[52] U.S. Cl. ....................................... 85/13; 85/21; 85/28
[58] Field of Search ................... 85/13, 11, 16, 49 R, 85/28, 21, 22

[56] References Cited

U.S. PATENT DOCUMENTS

| 363,866 | 5/1887 | Walker | 85/21 |
|---|---|---|---|
| 644,471 | 2/1900 | Schon | 85/49 |
| 1,089,878 | 3/1914 | Steinhauser | 85/11 |
| 1,889,092 | 11/1932 | George | 85/21 |
| 2,293,862 | 8/1942 | Sorenson | 85/13 |
| 3,204,265 | 9/1965 | Fiekers et al. | 85/21 |
| 3,241,424 | 3/1966 | Moehlenpah et al. | 85/13 |
| 3,731,583 | 5/1973 | Jureit | 85/13 |

FOREIGN PATENT DOCUMENTS

| 339,347 | 7/1921 | Germany | 85/13 |
|---|---|---|---|
| 122,959 | 10/1927 | Switzerland | 85/13 |
| 689,632 | 4/1953 | United Kingdom | 85/13 |
| 1,105,321 | 3/1968 | United Kingdom | 85/13 |

Primary Examiner—Marion Parsons, Jr.

Attorney, Agent, or Firm—Joseph H. Schley; Thomas L. Cantrell

[57] ABSTRACT

A fastener of the nail type adapted to be made in one piece from a narrow strip of sheet metal and composed of a quadrilateral, preferably, generally square, flat head with a single pair of prongs integrally projecting generally perpendicularly from the underside of the head and struck therefrom so as to form a single pair of elongated spaced generally parallel slots in said head, which slots are staggered longitudinally relative to each other and have relatively adjacent lineally offset inner end portions at the medial portion of said head and relatively remote outer end portions adjacent a pair of diagonally opposed corner portions of said head and which extend at acute angles to adjacent sides of said head. The prongs are disposed at the inner ends of the slots in generally parallel lineally offset spaced relation to each other at the medial portion of the head and in relatively close proximity to and on opposite sides of the diagonal between a second pair of opposed corners of said head whereby each of the aforesaid first corners of said head may coact with said prongs to provide a three-point support for the fastener with its head at an acute inclination to an engaged generally flat surface. The fastener is adapted to rock to this position when struck by a hammer while it is resting on one of its prongs and on a side of its head adjacent the corner of said head forming one of the points of the aforesaid support.

2 Claims, 7 Drawing Figures

U.S. Patent  March 21, 1978  4,079,656
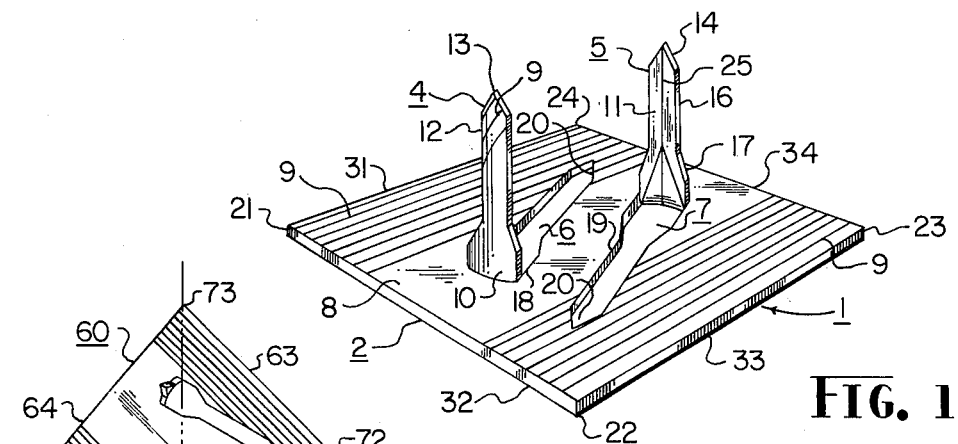
FIG. 1
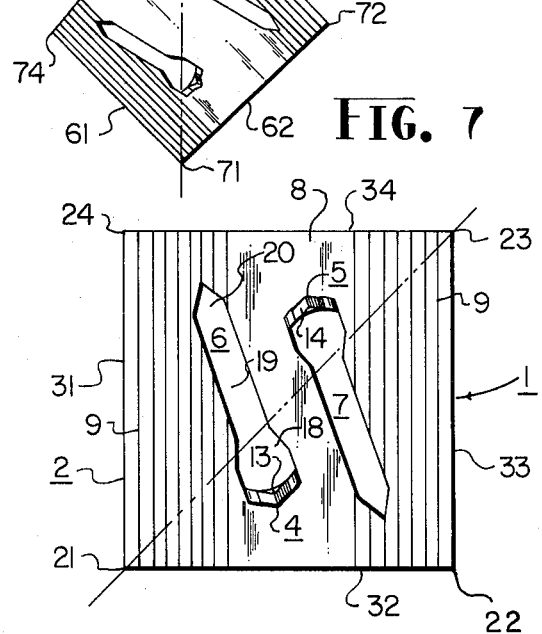
FIG. 2
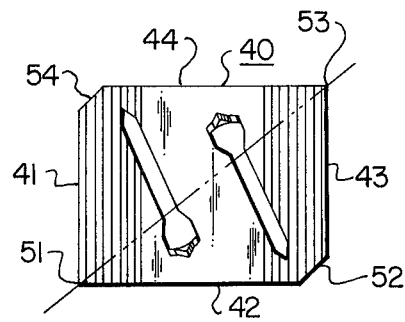
FIG. 7
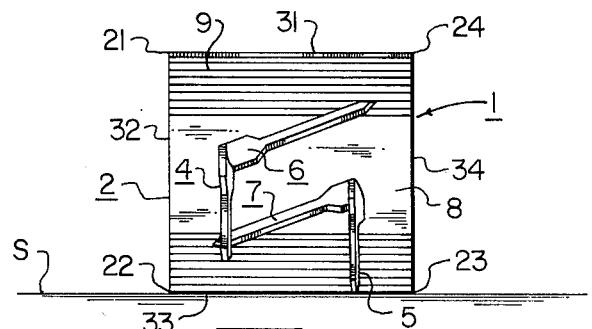
FIG. 6
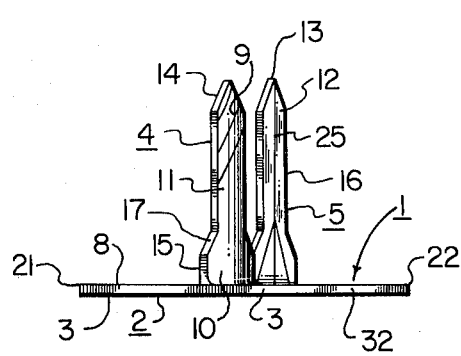
FIG. 3
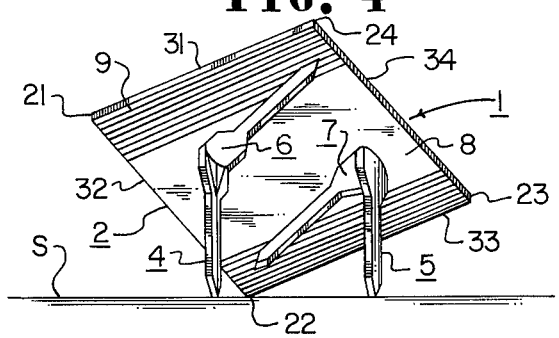
FIG. 4
FIG. 5

ONE PIECE TWO PRONG FLAT HEAD NAIL TYPE FASTENER

BACKGROUND OF THE INVENTION

Heretofore, paperboard, tar paper and other similar sheet material have been secured to generally flat surfaces, such as house roofs and walls, interior walls of railway freight cars and both interiors and exteriors of wooden crates, by nails or tacks having large heads or plates of enlarged size confined hereon and/or secured thereto. Also, it is customary to use this type of fastener for hanging and/or otherwise fastening decorative fabric, crepe paper and ribbons to wooden supports. One of the fasteners in present use is of two piece construction and is composed of a square plate having a small center opening for receiving a small headed nail, of ¾ of an inch to 1¼ inches in length, which has an upset portion adjacent its head for confining the plate therebetween. After the nail and plate are formed separately, said nail must be inserted through the center opening of the plate and bradded thereto by upsetting or otherwise. The single nail or prong of such fastener must be of appreciable length so as to resist dislodgment thereof. Since the manufacture of this type of fastener involves at least three steps, it is believed to be readily apparent that it would be more economical to eliminate the necessity for one or two of the steps.

Accordingly, the objects of this invention include the provision of a one piece fastener having a quadrilateral, preferably generally square, head and a pair of integral prongs projecting generally perpendicularly and struck from the head in spaced relationship at the medial portion of said head whereby the fastener may be formed from a narrow strip of sheet metal in a one-step relatively simple punching operation that is adapted to be repeated intermittently so as to continually form additional fasteners; whereby the costs of the metal, forming machinery and manufacture of the fastener are minimal due to its one piece construction and the narrowness of the strip sheet metal; whereby all of the metal is utilized without waste in forming the fastener; whereby the pair of prongs may be of less length than the single nail of the more or less conventional single prong fastener due to the greater surficial area of said pair of prongs; whereby the connection provided by the pair of prongs is more positive due to the freedom thereof to converge or diverge; whereby a three-point support for the fastener may be provided by the coaction of the spaced pair of prongs with either one of a pair of diagonally opposed corners of the head; whereby the head may be of different configurations including parallelogrammatic, rectangular, rhomboidal or have one side different from its other sides.

SUMMARY OF THE INVENTION

This invention relates to a novel one piece fastener of the nail type adapted to be made from a continuous strip of sheet metal and having a pair of spaced generally parallel prongs integral with and projecting generally perpendicularly from the underside of a flat quadrilateral head. The fastener is designed to secure paperboard, tar paper and similar sheet material to generally flat surfaces, such as house roofs and walls. Preferably, the head is generally square but could be only equiangular or equilateral or parallelogrammatic or rhomboidal or have one side of different length than its other sides, whereby the configuration of said head could be more nearly diamond shaped or rectangular or other quadrilateral configuration rather than exactly square. The prongs have outer end or tip portions and inner end or base portions and are punched or struck from the head so as to provide complementary slots therein which extend in opposite directions and which are generally parallel to and offset or staggered longitudinally of each other. The inner end or base portions of the generally parallel slots are disposed in lineally offset spaced relationship at the medial portion of the head and in equally spaced, relatively close proximity to and on opposite sides of the diagonal of a first pair of the opposed corners of said head, and the prongs are disposed at said inner end or base portions of said slots. The longitudinal axis of each slot extends at an acute angle to an adjacent margin or side of the head so that the tip portions of the slots are relatively remote from each other and relatively adjacent to a second or other pair of the diagonally opposed corners of said head.

This arrangement permits the prongs to be of maximum length and the tips of the slots to be spaced from the aforesaid second pair of diagonally opposed corners sufficiently to preclude undue weakening of the head. Due to the spaced relationship of the prongs and the positioning thereof at the medial portion of the head, said prongs are adapted to coact with either of the aforesaid second pair of diagonally opposed corners to provide a three-point support for the fastener and thereby facilitate the driving of said prongs into a generally flat surface, particularly when the surface is relatively soft and permits slight embedding of the point of said corner therein.

It is noted that the aforesaid first pair of diagonally opposed corners of the head are incapable of coacting with the prongs to create any type of support because said prongs are positioned so relatively close to or in approximate alignment with the diagonal between said first pair of diagonally opposed corners. When the fastener is supported by one or the first of a pair of adjacent sides of the head having one, or the first, of the second pair of diagonally opposed corners of said head therebetween and by one of the prongs resting on a surface, said fastener tends to rock to the three-point support, formed by said corner and both prongs, when struck by a hammer, since the other prong is unengaged or free and relatively close to the other or second, unengaged or free, side of said pair of adjacent sides and beyond the center of gravity. Either one of the other or second pair of adjacent sides of the head, having the other or second corner of the aforesaid second pair of diagonally opposed corners of said head therebetween and in opposed relation to the first pair of adjacent sides, coacts with the prongs in the same manner. Manifestly, this structure minimizes or reduces the tendency of the fastener to slant when driven by causing both prongs to engage the surface.

Since the head of the fastener is, preferably, generally square, rectangular or oblong and the prongs are punched or struck from said head, there is no waste in forming said fastener from a continuous strip or roll of suitable sheet metal having a width equal to the length of one of the margins or sides of said head. If desired, the points of the corner portions of the head, which coact with the prongs to provide the three-point support for the fastener, may be bevelled so as to increase the areas of surficial contact of said corner portions of said head whereby the latter is generally hexagonal. The margins or sides of the head which extend transversely of the metal strip may extend at oblique angles to the longitudinal margins of said strip, and said transverse sides of said head may be nonparallel. In fact, the exact shape of the head is not critical so long as it has opposed corner or perimetrical portions capable of coacting with the pair of prongs to provide the three-point support for the fastener.

BRIEF DESCRIPTION OF THE DRAWINGS

FIG. 1 is a perspective view of a one piece two prong flat head nail type fastener constructed in accordance with the invention and in inverted position.

FIG. 2 is a bottom plan view of the fastener,

FIG. 3 is a side elevational view of said inverted fastener,

FIG. 4 is an underside front perspective view of said fastener resting on one of the sides of its head and one of the prongs, FIG. 5 is an underside front perspective view showing the counterclockwise one-quarter rock of said fastener from its FIG. 4 position to its three-point support position provided by the coaction of its prongs with one of the corners of its head, FIG. 6 is a bottom plan view of a modified fastener having an oblong rectangular head with one pair of its diagonally opposed corners bevelled so as to increase the support area of each of said corners, and FIG. 7 is a bottom plan view of another embodiment having a quadrilateral head with a least a pair of opposed nonparallel sides and at least a pair of unequal diagonally opposed corners.

DESCRIPTION OF A PREFERRED EMBODIMENT

In the drawings, the numeral 1 designates a fastener of the nail type constructed in accordance with the invention and formed in one piece from suitable sheet metal, such as 18 guage mild steel, capable of being cut and formed without undesirable distortion thereof and subsequent bending during use. The fastener 1 includes a quadrilateral head or plate 2 having a flat top surface 3 (FIG. 3) and a pair of identical elongate prongs 4, 5 struck or punched therefrom whereby complementary elongate openings or slots 6, 7 are cut in the head. Preferably, the head 2 is generally square (equilateral rectangle) and the sheet metal is in strip form whereby its margins form one pair of the opposed sides of said head; however, said head could be quadrilateral since it need not be exactly equiangular and/or equilateral and/or parallelogrammatic. Therefore, the flat head may be more nearly of diamond or rectangular configuration or perimeter rather than absolutely square as shown. Prior to the formation of the prongs 4, 5, the generally square head may have its underside 8 (FIGS. 1, 2, 5) scored by elongate generally parallel shallow grooves or notches 9 coextensive therewith between one of the pairs of generally parallel opposed margins or sides 32, 34 of said head and in generally parallel relation to the other pair of opposed margins or sides 31, 33 thereof. As will be apparent hereinafter, these elongate grooves or notches extend diagonally of the longitudinal axis of each of the prongs which are integral with the flat head and project generally perpendicularly from the underside 8 thereof.

Each of the prongs 4, 5 has an inner end or base portion 10 at its juncture with the head 2, an intermediate or shank portion 11 and an outer end or tip portion 12 terminating in a point 13 due to the acute convergence of its inclined lateral margins or sides 14. Each base portion 10 has generally parallel lateral margins or sides 15 which converge at their outer ends to form generally parallel lateral margins or sides 16 of shank portion 11 and thereby provide inclined shoulders 17 between the sides 15, 16 of said base and shank portions. Since the prongs are punched or struck from the flat head, each of the slots 6, 7, necessarily, has an identical perimeter or configuration which is composed of mirror-like base 18, shank 19 and tip 20 portions. The slots have parallel axes and extend in opposite directions with the base portions 18 thereof in relatively adjacent relationship at the medial portion of the head 2.

It is noted that the slots 6, 7 are staggered or offset longitudinally of each other so as to dispose the base portions 18 thereof in lineally offset relatively adjacent relation to each other and in equally spaced, relatively close proximity to and on opposite sides of a diagonal extending between a pair of opposed corners 21, 23 of the flat head. Also, each of the parallel slots has its longitudinal axis extending in acute angular relation to an adjacent margin or side 31, 33 of the head 2, whereby the tip portions 20 of said slots are relatively remote from each other and relatively adjacent the other pair of diagonally opposed corners 22, 24 of said head. This acute angular relationship permits the tip portions of slots 6, 7 to be spaced from the aforesaid adjacent diagonally opposed corners 22, 24 of the flat head sufficiently to preclude undue weakening of said head and without sacrificing the length of prongs 4, 5.

As shown at 25 in FIGS. 1, 3, 5, the prongs are strengthened by each being crimped along its medial longitudinal axis whereby said prong is arcuate or generally V-shaped in cross-section throughout its length. This crimping operation may be and, preferably, is performed substantially simultaneously with the punching or striking of the prongs 4, 5 from the head 2. It is readily apparent that the spaced grooves 9 in the underside of the head extend diagonally of the convex surfaces of the prongs due to the acute angular disposition of the slots 6, 7 relative to the adjacent margins or sides 31, 33, respectively, of said head and are designed to resist loosening of said prongs when driven. Since they project from the base portions 20 of the slots, the prongs 4, 5 are disposed in lineally offset relationship and in offset spaced relationship at, or near, the medial portion of the head in equally spaced relatively close proximity to and on opposite sides of the diagonal of the opposed corners 21, 23 of said head. Preferably, each of the prongs 4 or 5 is equally spaced from its adjacent corner 21 or 23 of the head 2 and both of said prongs are equally spaced with respect to the other diagonally opposed corners 22, 24 (FIG. 2) whereby either one of said corners 22, 24 may coact with said prongs to provide a three-point support (FIG. 5) for the fastener with its flat head at an acute inclination to a generally flat surface, such as tar paper over wood, engaged by said fastener and with adjacent margins or sides 32, 33 or 31, 34 of said head in spaced oblique relation to the engaged surface.

In addition to facilitating the initial driving of the prongs 4, 5 into the aforesaid surfaces, this three-point in coaction with the spaced relationship of said prongs at the medial portion of the head minimizes or reduces the tendency of the fastener to cant or tilt in the usual manner of two-prong fasteners, such as staples. This is particularly true when the aforesaid surface is relatively soft, as is tar paper, so as to permit slight embedding of one of the head corners 22 or 24 therein. Manifestly, neither of the diagonally opposed corners 21, 23 are capable of coacting with the prongs to form any support for the fastener since said prongs are in approximate alignment with the diagonal of said corners. In use, when the fastener rests on its right hand prong 5 and side 33 of its head 2 as shown in FIG. 4, a hammer or percussive blow on said head causes said fastener to rock counterclockwise on the corner 22 toward side 32 of said head and the three-point support since the other or left hand prong 4 overbalances said fastener due to said prong 4 being to the left of the center of gravity of said fastener. Conversely, if the fastener rests on its left hand prong 4 and side 32 of its head when it is struck, said fastener rocks clockwise or oppositely on the same corner 22 toward side 33 of said head due to the right hand prong 5 being to the right of the aforesaid center of gravity. It is believed to be readily apparent that the other margins or sides 31, 34 of head 2 coact with prongs 4, 5 in the same manner to cause rocking of the fastener on the diagonally opposed corner 24 in opposite directions toward the other side 34 or 31 and the three-point support when driven by a hammer. In either event, the aforesaid three-point support is created and proper driving of the fastener is more easily performed.

As stated hereinbefore, the perimetrical configuration of the head of the fastener is subject to variation. Head 40 of the modified fastener shown in FIG. 6 may be of oblong rectangular shape whereby its opposed transverse margins or sides 41, 43 are of less length than its longitudinal sides 42, 44. The head 40 has its corner portions 51, 52, 53, 54 arranged in diagonally opposed pairs and all of said corner portions may be right angular as illustrated by corners 51, 53 and in the same manner as the corners 21–24 of fastener head 2. If desired, diagonally opposed corner portions 52, 54 of either head may be bevelled so as to enlarge the areas of surficial contact of said corner portions for the aforesaid three-point support. It is noted that this fastener also may be formed from strip metal without waste except for the bevelling of corner portions 52, 54.

The embodiment of FIG. 7 has a quadrilateral head 60 with its margins or sides 61, 62, 63, 64 being of different lengths, such as adjacent sides 61, 62 being shorter than sides 63, 64. Also, adjacent corners 71, 72 may be right angular, while corner 73 may be acute and corner 74 obtuse. Of course, the configurations or shapes of diagonally opposed corners 71, 73 are immaterial since they do not and cannot function as a part of any support for the fastener. Also, the exact angularities of opposed corners 72, 74 are not critical so long as they are capable of forming parts of three-point fastener supports in a manner similar to corners 22, 24 of generally square head 2 and corner portions 52, 54 of oblong rectangular head 40.

Manifestly, it is within the scope of this invention to bevel opposed corners 22, 24 and 72, 74 in the same manner as corner portions 52, 54 so as to amplify or increase the surficial contact areas thereof. Also, head 2 need not be equilateral and heads 2 and 40 need not be equiangular; however, the rectangular and/or rhomboidal configurations are preferred due to economy of manufacture and desirable uniformity in handling the fastener resulting from the use of strip metal as set forth hereinbefore. It has been found that a highly satisfactory fastener is produced when its head has approximately on 1 inch sides and its prongs are about .600 of an inch in length. The angularity of each of the slots of the head to its adjacent side may be 20° as shown in FIGS. 1–5 or 25° (FIG. 6) or 15° (FIG. 7).

The foregoing description of the invention is explanatory thereof and various changes in the size, shape and materials, as well as in the details of the illustrated construction may be made, within the scope of the appended claims, without departing from the spirit of the invention.

I claim:

1. A fastener of the nail type adapted to be made in one piece from thin metal comprising
    a polygonal flat head having at least four sides arranged in opposed pairs and at least a first pair of opposed corner portions and at least a second pair of opposed corner portions between adjacent sides.
    a single pair of prongs integral with and projecting generally perpendicularly from the underside of the head at its medial portion and forming a pair of elongated spaced slots in said head,
    the elongated spaced slots extending in opposed side-by-side and staggered relationship whereby said slots have relatively adjacent offset inner end portions and relatively remote outer end portions,
    the prongs being disposed at the adjacent offset inner end portions of said spaced slots in offset relatively adjacent relationship at said medial portion of said head and relatively remote from the corner portions thereof,
    each of said spaced slots having its longitudinal axis extending at an acute angle to an adjacent side of one of the opposed pairs of sides of said head and its inner end portion spaced from the aforesaid adjacent side at a greater distance than its outer end portion whereby said prongs may be of maximum length without undue weakening of said head,
    the acute angular relationship of each slot to an adjacent side of said head disposing the transverse axis of each prong in nonparallel nonright-angular relation to any of said sides whereby there is less tendency for said prongs to bend when the fastener is driven from a position in which said head rests on one of its sides nonadjacent said slots and one of said prongs, and
    each of the second pair of opposed corner portions of said head having a coplanar margin extending at obtuse angles to the contiguous sides of said head.

2. A fastener of the nail type adapted to be made in one piece from thin metal comprising
    a polygonal flat head having at least four sides arranged in opposed pairs and at least a first pair of opposed corner portions and at least a second pair of opposed corner portions between adjacent sides,
    a single pair of prongs integral with and projecting generally perpendicularly from the underside of the head at its medial portion and forming a pair of elongated spaced slots in said head,
    the elongated spaced slots extending in opposed side-by-side and staggered relationship whereby said slots have relatively adjacent offset inner end portions and relatively remote outer end portions,
    the prongs being disposed at the adjacent offset inner end portions of said spaced slots in offset relatively adjacent relationship at said medial portion of said head and relatively remote from the corner portions thereof,
    each of said spaced slots having its longitudinal axis extending at an acute angle to an adjacent side of one of the opposed pairs of sides of said head and its inner end portion spaced from the aforesaid adjacent side at a greater distance than its outer end portion whereby said prongs may be of maximum length without undue weakening of said head, the acute angular relationship of each slot to an adjacent side of said head disposing the transverse axis of each prong in nonparallel nonright-angular relation to any of said sides whereby there is less tendency for said prongs to bend when the fastener is driven from a position in which said head rests on one of its sides nonadjacent said slots and one of said prongs, said head being generally equiangular and generally equilateral and each of the second pair of opposed corner portions of said head being generally angular, and each of said second pair of opposed angular corner portions has its apex relieved to provide a coplanar margin.

* * * * *